(12) United States Patent
Chen et al.

(10) Patent No.: US 11,182,018 B2
(45) Date of Patent: Nov. 23, 2021

(54) TOUCH DISPLAY DRIVING DEVICE AND DRIVING METHOD IN THE SAME

(71) Applicant: NOVATEK MICROELECTRONICS CORP., HsinChu (TW)

(72) Inventors: Po-Ying Chen, Tainan (TW); Wen-Yi Hsieh, Tainan (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 16/286,686

(22) Filed: Feb. 27, 2019

(65) Prior Publication Data

US 2019/0272076 A1 Sep. 5, 2019

Related U.S. Application Data

(60) Provisional application No. 62/636,872, filed on Mar. 1, 2018.

(51) Int. Cl.
*G06F 3/041* (2006.01)
*G09G 3/36* (2006.01)

(52) U.S. Cl.
CPC ........ *G06F 3/04166* (2019.05); *G06F 3/0412* (2013.01); *G06F 3/04164* (2019.05);
(Continued)

(58) Field of Classification Search
CPC ....... G09G 2310/04; G09G 2310/0262; G09G 2310/0224; G09G 2310/021; G09G 2310/0213; G09G 2310/0205; G09G 2310/0202; G09G 2310/02; G09G 2310/00; G09G 2310/0227; G09G 2310/0243; G09G 3/36; G09G 3/34; G09G 3/2092; G09G 3/2085; G09G 3/20; G09G 3/00; G09G 2310/0297; G09G 2310/0264;
(Continued)

(56) References Cited

U.S. PATENT DOCUMENTS 8,723,896 B2 * 5/2014 Huang ..................... G09G 3/20
345/690
9,305,504 B2 * 4/2016 Yu ......................... G09G 3/3648
(Continued)

FOREIGN PATENT DOCUMENTS

EP 3182257 A1 * 6/2017 ........... G09G 3/3696
TW 104136095 A * 5/2017
(Continued)

*Primary Examiner* — Julie Anne Watko
(74) *Attorney, Agent, or Firm* — McClure, Qualey & Rodack, LLP (57) ABSTRACT

The present invention discloses a touch display driving device and a driving method in the same. The touch display driving device is used for driving a touch display panel, the touch display panel comprising a plurality of common electrode blocks and a plurality of display regions. The touch display driving device comprising a multiplexing circuit which is configured to: during a display period, couple one or more common electrode blocks corresponding to one of the display regions which is to be displayed during the display period to a first voltage; and during the display period, couple one or more of the common electrode blocks corresponding to the display regions which are not to be displayed during the display period to a second voltage.

6 Claims, 8 Drawing Sheets

(52) U.S. Cl.
CPC ....... *G06F 3/04184* (2019.05); *G09G 3/3611* (2013.01); *G09G 2310/0297* (2013.01)

(58) Field of Classification Search
CPC ...... G06F 3/0412; G06F 3/0416; G06F 3/041; G06F 3/03; G06F 3/01; G06F 3/00; G06F 3/04166; G06F 3/04184; G06F 3/0418; G06F 3/04164; G06F 3/3611
See application file for complete search history.

(56) References Cited

U.S. PATENT DOCUMENTS

| | | | | |
|---|---|---|---|---|
| 9,727,163 | B2* | 8/2017 | Mizuhashi | G06F 3/0416 |
| 10,402,012 | B2 | 9/2019 | Yang et al. | |
| 2003/0006955 | A1* | 1/2003 | Tsuchi | G09G 3/3688 |
| | | | | 345/92 |
| 2005/0057470 | A1* | 3/2005 | Tobita | G09G 3/20 |
| | | | | 345/89 |
| 2005/0163669 | A1* | 7/2005 | Taylor | A61L 9/015 |
| | | | | 422/121 |
| 2005/0168491 | A1* | 8/2005 | Takahara | G09G 3/3241 |
| | | | | 345/690 |
| 2006/0077738 | A1* | 4/2006 | Kwon | G09G 3/3283 |
| | | | | 365/203 |
| 2006/0227628 | A1* | 10/2006 | Eriguchi | G09G 3/20 |
| | | | | 365/189.07 |
| 2006/0227638 | A1* | 10/2006 | Kudo | G09G 3/20 |
| | | | | 365/203 |
| 2008/0100605 | A1* | 5/2008 | Shirai | G09G 3/3688 |
| | | | | 345/206 |
| 2009/0160787 | A1* | 6/2009 | Westerman | G06F 3/0418 |
| | | | | 345/173 |
| 2010/0156868 | A1* | 6/2010 | Hirayama | G09G 3/3655 |
| | | | | 345/208 |
| 2014/0211363 | A1* | 7/2014 | Oebser | H01H 47/226 |
| | | | | 361/190 |
| 2016/0320886 | A1* | 11/2016 | Kim | G06F 3/0412 |
| 2017/0115789 | A1 | 4/2017 | Conway et al. | |
| 2017/0269781 | A1* | 9/2017 | Yang | G06F 3/0418 |
| 2018/0192538 | A1* | 7/2018 | Sakalkar | G06F 1/26 |

FOREIGN PATENT DOCUMENTS

| | | |
|---|---|---|
| TW | 201717185 A | 5/2017 |
| TW | 201735000 A | 10/2017 |

* cited by examiner

TOUCH DISPLAY DRIVING DEVICE AND DRIVING METHOD IN THE SAME

This application claims the benefit of U.S. provisional application Ser. No. 62/636,872, filed Mar. 1, 2018, the subject matter of which is incorporated herein by reference.

BACKGROUND OF THE INVENTION

Field of the Invention

The invention relates to a touch display driving device, and especially to a driving method in touch display driving device.

Description of the Related Art

In modern life, there exists several input mechanisms for performing operation on electronic devices. Touch display devices such as touch screens are increasingly being popular in portable electronic devices due to their ease of operation and versatility. With touch display devices, users can perform selection or move objects on a screen by simply moving a finger or a stylus on a touch screen. With the growing maturity of touch with display driver integration (TDDI) technology, how to design a driving method suitable for a touch display device is one of the current topics in the industry.

Figure 1:
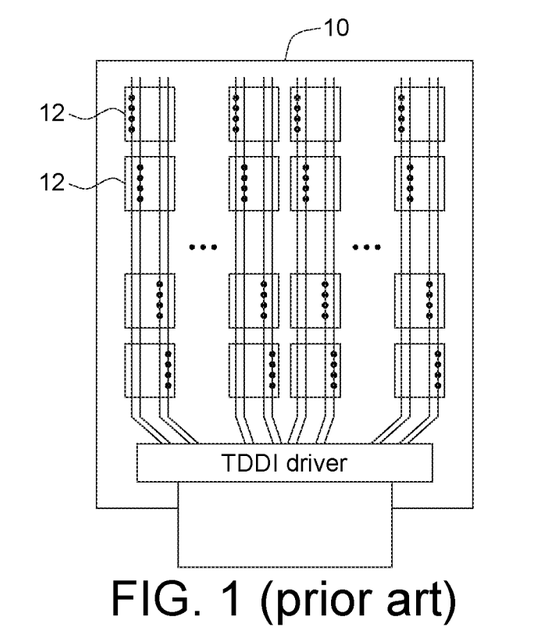
FIG. 1 (prior art) shows a schematic diagram of a conventional display device having a TDDI driver.

In conventional liquid crystal displays (LCD) without touch sensing function, bottom plates of all the pixel capacitors (e.g., liquid crystal capacity) are common electrodes and are coupled to a common voltage VCOM provided by a driver IC, and top plates of the pixel capacitors are pixel electrodes and are provided by a pixel voltage from the driver IC. In a touch display panel with a TDDI driver, the bottom plate of the pixel capacitors can be divided into a number of blocks, i.e., a number of common electrodes, according to touch detecting resolution such that the common electrodes serve as touch detecting electrodes when the touch display panel performs touch detecting function. FIG. 1 shows a block diagram of a conventional touch display device having a TDDI driver, wherein a block labeled by TDDI in FIG. 1 is a TDDI driver. As shown in FIG. 1, bottom plates of the pixel capacitors of the touch display panel 10 are divided into a number of blocks 12 (i.e., common electrodes 12). A multiplexing circuit in the TDDI driver (not shown) can selectively couple the common electrode the common voltage VCOM in a display mode and couple the common electrode to a touch detecting circuit of the TDDI driver in a touch detecting mode.

Figure 2:
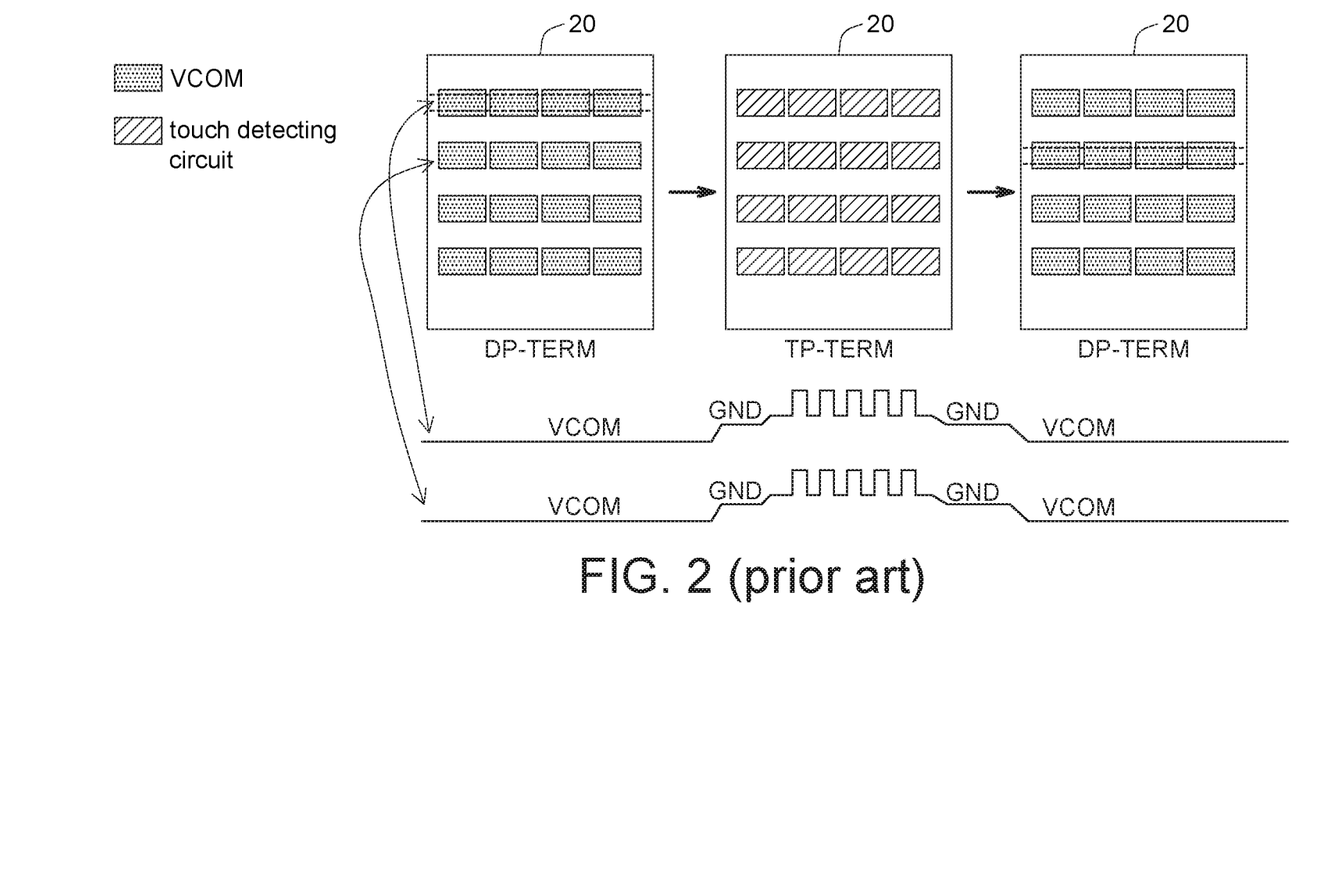
FIG. 2 (prior art) shows a schematic diagram of operations that a conventional touch display device switches between displaying and touch detecting.

FIG. 2 shows a schematic diagram of operations that the common electrodes of a conventional touch display panel switch between displaying and touch detecting. In the example of FIG. 2, the bottom plates of the pixels of the touch display panel 20 is divided into 4×4 blocks as 16 common electrodes, and an active display area is divided into 4 display regions r #1-r #4, each of the display regions includes tens or hundreds of horizontal display lines, and the common electrodes of each display region can be regarded as a row of common electrodes. Each frame period includes a display period and a touch detecting period. The display period is called a DP-TERM, and the touch detecting period is called a TP-TERM. During each display period, pixel data may be displayed on a corresponding display region. During each touch detecting period, the TDDI driver performs touch detection by one or more columns of common electrodes (used as touch detection electrodes) of the touch display panel. As the approach shown in FIG. 2, the TDDI driver repeats the switching between DP-TERM and TP-TERM to complete a full screen display and touch detection of the entire panel. The common electrodes connected to the common voltage VCOM during the display period are depicted by dotted blocks, and the common electrodes which serve as touch detection electrodes are depicted by slashed blocks.

In a conventional practice, the sixteen common electrodes corresponding to all the four display regions r #1-r #4 are connected to the common voltage VCOM during each display period, even though pixel data of only one display region are refreshed and pixel data of other display regions are not refreshed yet.

The waveform shown in the lower half of FIG. 2 is a schematic diagram of the voltage at the output of the TDDI driver connected to the common electrodes. The upper waveform represents the voltage connected to the first common electrode row (i.e., the common electrodes corresponding to the first display region r #1) during the display period and the touch detecting period. The lower waveform represents the voltage connected to the second common electrode row (i.e., the common electrode row corresponding to the second display region r #2) during the display period and the touch detecting period.

SUMMARY OF THE INVENTION

An aspect of the present invention discloses a touch display driving device for driving a touch display panel, the touch display panel comprising a plurality of common electrode blocks and a plurality of display regions. The touch display driving device comprises a multiplexing circuit which is configured to: during a display period, couple one or more common electrode blocks corresponding to one of the display regions which is to be displayed during the display period to a first voltage; and during the display period, couple one or more of the common electrode blocks corresponding to the display regions which are not to be displayed during the display period to a second voltage.

Another aspect of the present invention discloses a driving method, used in a touch display driving device. The touch display driving device comprises a multiplexing circuit and is utilized for driving a touch display panel comprising a plurality of common electrode blocks and a plurality of display regions. The driving method comprises: during a display period, by the multiplexing circuit, coupling one or more common electrode blocks corresponding to one of the display regions which is to be displayed during the display period to a first voltage; and during the display period; by multiplexing circuit a; coupling one or more of the common electrode blocks corresponding to the display regions which are not to be displayed during the display period to a second voltage.

The above and other aspects of the invention will become better understood with regard to the following detailed description of the preferred but non-limiting embodiment(s). The following description is made with reference to the accompanying drawings.

DETAILED DESCRIPTION OF THE INVENTION

The touch display device and the driving method shown in FIGS. 1 to 2 have following disadvantages.

(1) The common voltage VCOM outputted by the TDDI driver is supplied to each common electrode via the multiplexing circuit and the traces in the touch display panel, and the resistance of the path from a common voltage generation circuit in the TDDI driver to the common electrode is larger than the resistance of the path from a common voltage generation circuit in a conventional display driver (without touch detecting function) to the common electrode of a conventional display panel. When displaying, pixel voltages may be coupled to the common electrodes via the pixel capacitors, so that the common electrodes need to take a certain time for recovering to the ideal common voltage VCOM. The speed that the common electrodes recover to the ideal common voltage VCOM is hereinafter referred to as "recovery speed". When the resistance of the path of the common voltage VCOM is large, the recovery speed becomes slow, which may lead to abnormality during displaying.

(2) If the difference between the resistances of the said paths with respect to adjacent common electrodes is too large, the recovery time of the common voltage VCOM of the adjacent common electrodes may be different, and a discontinuous display quality may be viewed on the screen. For example, a common electrode that is farther away from the TDDI driver (such as the common electrode block near the top of the touch display panel in FIG. 1) has a slower recovery speed because of a long path distance and a larger resistance. A common electrode that is closer to the TDDI driver (such as the common electrode block near the bottom of the touch display panel in FIG. 1) has a faster recovery speed because of a short path distance and a smaller resistance.

Figure 3A:
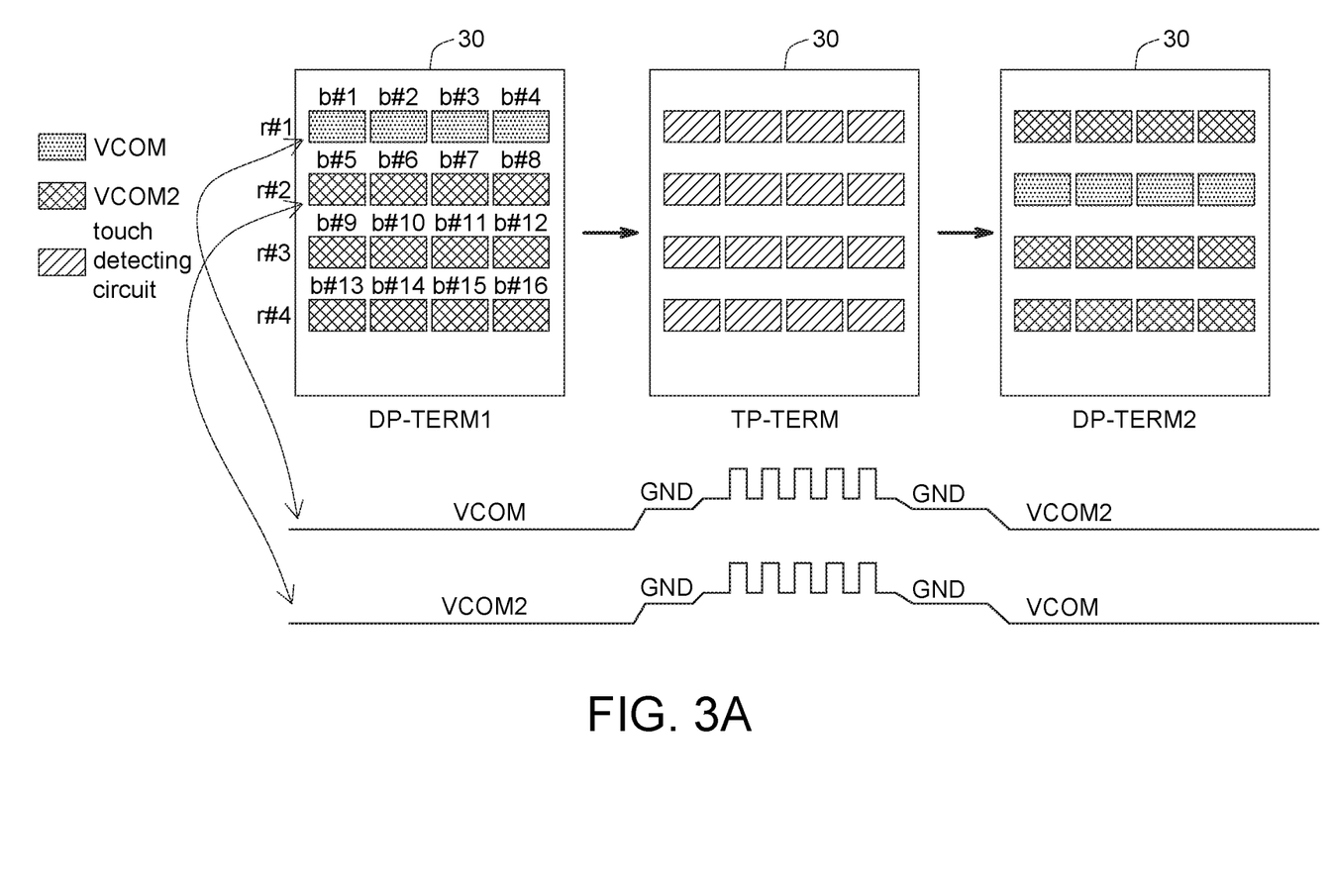
FIG. 3A shows a schematic diagram of operations that a touch display device according to an embodiment of the present invention switches between displaying and touch detecting.
Figure 3B:
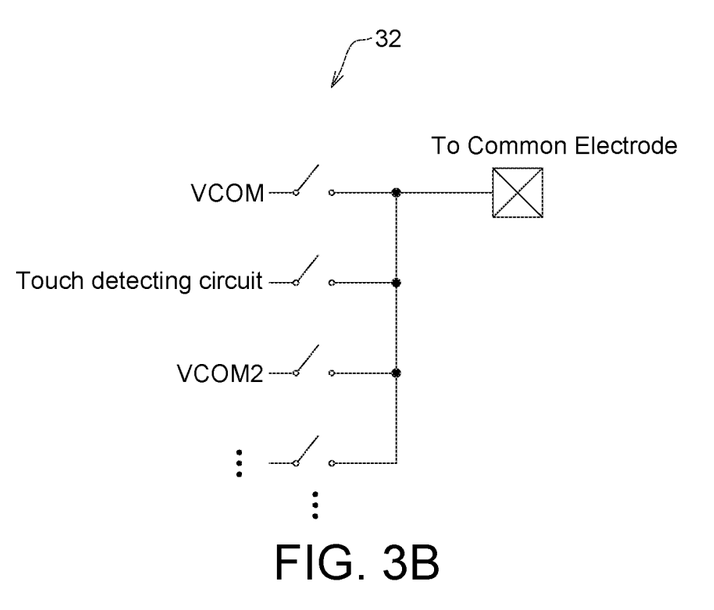
FIG. 3B shows a schematic diagram of a multiplexer (MUX) circuit according to an embodiment of the present invention used in the structure of FIG. 3A.

Referring to FIG. 3A, FIG. 3A shows a schematic diagram of operations that a touch display device according to an embodiment of the present invention switches between displaying and touch detecting. The touch display device (not shown) includes a touch display panel 30 and a touch with display driver integration (TDDI) driver (not shown). The TDDI driver includes a multiplexing circuit (MUX) 32, which has a schematic diagram as shown in FIG. 3B. The touch display panel 30 includes a number of common electrodes. The touch display panel is a touch display driving device and includes a number of display regions. In this embodiment, the common electrodes are 4×4 (i.e., 16) common electrode blocks b #1-b #16, and an active display area of touch display device is divided into four display regions (i.e., the touch display panel includes four display regions r #1-r #4). FIG. 3B shows a schematic diagram of a multiplexing circuit according to an embodiment of the present invention used in the structure of FIG. 3A. As shown in FIG. 3B, the multiplexing circuit 32 is configured to selectively couple a first common voltage VCOM, a touch detecting circuit and a second common voltage VCOM2 to the common electrode blocks b #1-b #16. The second common voltage VCOM2 is different from the first common voltage VCOM and may be a ground voltage. In an embodiment, the multiplexing circuit 32 may be controlled by a controller of the touch display device. In another embodiment, the multiplexing circuit 32 is further configured to selectively couple a high impedance terminal to the common electrode blocks corresponding to the display region not to be displayed during the display period.

During a first display period (DP-TERM1), the touch display panel 30 displays pixel data of a first display region r #1. The first display region r #1 includes a number of horizontal display lines, and pixel data of the horizontal display lines are refreshed line by line. The multiplexing circuit 32 couples the common electrode blocks b #1-b #4 corresponding to the first display region r #1 to the first common voltage VCOM provided by the TDDI driver. The other common electrode blocks b #5-b #16 corresponding to the other display region r #2-r #4 are coupled to the second common voltage VCOM2 by the multiplexing circuit 32. The second common voltage VCOM2 may be a voltage such as ground or Hi-Z. In FIG. 3A, the common electrode blocks b #1-b #4 coupled to the first common voltage VCOM are represented by dotted blocks, and the common electrode blocks b #5-b #16 coupled to the second common voltage VCOM2 are represented by mesh blocks.

In an embodiment, the TDDI driver includes one or more operational amplifier (OP), which are in a common voltage generation circuit, and the first common voltage VCOM is provided by the one or more OP. When the pixel voltages are coupled to the common electrodes via the pixel capacitors, the process of pulling the common electrodes from the pixel voltages to the first common voltage VCOM by the OP(s) requires power consumption. With the approach described above and shown in FIG. 3A (i.e., during a display period, the multiplexing circuit 32 only couples the common electrodes corresponding to a display region which is currently displayed to the first common voltage VCOM), the loading (i.e., the pixel capacitors) seen by the common voltage generation circuit which provides the first common voltage VCOM (e.g., the TDDI driver or the OP(s) of the TDDI driver) may be decreased. In this embodiment, the loading seen by the TDDI driver is decreased to ¼ because only the common electrodes corresponding to ¼ amount of the total display regions are driven by the first common voltage VCOM, comparing with the loading in FIG. 2. Therefore, the recovery speed may be increased. Furthermore, the power consumption for recovery may be decreased. In this embodiment, the power consumption is decreased to ¼ of original power consumption for recovery.

A touch detecting period (TP-TERM) comes after the first display period. During the touch detecting period, all the common electrode blocks b #1-b #16 are coupled to a touch detecting circuit (not shown) of the TDDI driver by the multiplexing circuit 32, and the common electrodes serve as touch detection electrodes for detecting whether a touch event occurs. In FIG. 3A, the common electrodes blocks b

1-b #16 connected to the touch detecting circuit of the TDDI driver are represented by slashed blocks. Then, during a second display period (DP-TERM2), the touch display panel 30 displays the pixel data of a second display region r #2, and the multiplexing circuit 32 only couples the common electrode blocks b #5-b #8 corresponding to the second display region r #2 to the first common voltage VCOM. The other common electrode blocks b #1-b #4, b #9-b #16 corresponding to the display regions r #1, r #3 and r #4 are coupled to the VCOM2 voltage by the multiplexing circuit 32.

The lower part of FIG. 3A shows waveforms of the output voltage provided by the TDDI driver. The upper waveform shows a waveform of the output voltage provided to the common electrode blocks b #1-b #4 corresponding to the first display region r #1 by the TDDI driver, and the lower waveform shows a waveform of the output voltage provided to the common electrode blocks b #5-b #8 corresponding to the first display region r #2 by the TDDI driver.

Comparing with the example shown in FIG. 2, during each display period, the multiplexing circuit 32 couples the common electrode blocks corresponding to the display region to be displayed during the current display period to the first common voltage VCOM rather than couples all the common electrode blocks to the first common voltage VCOM. With such approach, the loading and the power consumption of the circuit (e.g., the TDDI driver or the OP of the TDDI driver) providing the first common voltage VCOM can be decreased, and the recovery speed can be increased accordingly.

Figure 3C:
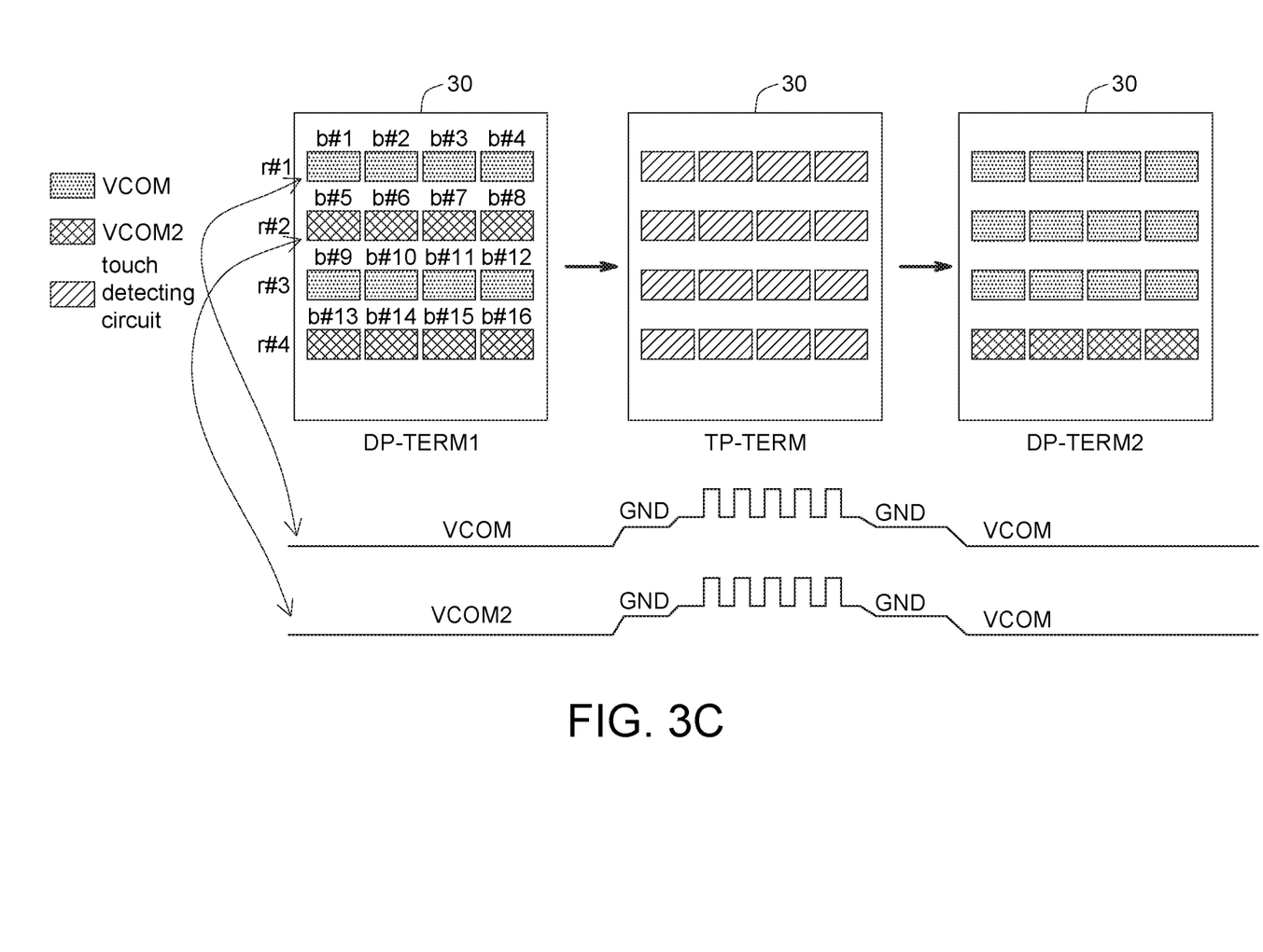
FIG. 3C shows a schematic diagram of operations that a touch display device according to another embodiment of the present invention switches between displaying and touch detecting.

FIG. 3C shows a schematic diagram of operations that a touch display device according to another embodiment of the present invention switches between displaying and touch detecting. In this embodiment, during the display period, the multiplexing circuit not only couples the common electrode blocks corresponding to the display region to be displayed during the current display period to the first common voltage VCOM, but also couples the common electrode blocks corresponding to at least one of the display regions which are not to be displayed during the current display period to the first common voltage VCOM. In the embodiment of FIG. 3C, during a first display period (DP-TERM1), the multiplexing circuit 32 couples the common electrode blocks b #1-b #4 corresponding to the display region r #1 to be displayed during the first display period to the first common voltage VCOM, and the multiplexing circuit 32 also couples the common electrode blocks b #9-b #12 corresponding to the display region r #3 not to be displayed during the first display period to the first common voltage VCOM. The other common electrode blocks b #5-b #8, b #13-b #16 corresponding to the display regions r #2, r #4 are coupled to the second common mode voltage VCOM2 by the multiplexing circuit 32. During a second display period (DP-TERM2), the multiplexing circuit 32 couples the common electrode blocks b #5-b #8 corresponding to the display region r #2 to be displayed during the second display period to the first common voltage VCOM, and the multiplexing circuit 32 also couples the common electrode blocks b #1-b #4, b #9-b #12 corresponding to the display region r1 #1, r #3 not to be displayed during the second display period to the first common voltage VCOM. The other common electrode blocks b #13-b #16 corresponding to the display regions r #4 are coupled to the second common voltage VCOM2 voltage by the multiplexing circuit 32.

That is, the present invention does not limited by the amount of the common electrode blocks which are coupled to the common voltage corresponding to the display region to be displayed, during a display period by the multiplexing circuit 32. However, considering of power consumption and recovery speed, the amount of the common electrode blocks which are coupled to the first common voltage VCOM during a display period is preferably less than the total amount of the common electrode blocks. Additionally, the amount of the common electrode blocks which are coupled to the Common voltage VCOM during each display period can either be the same or different. Furthermore, as shown in FIG. 3C, the common electrode blocks which are coupled to the Common voltage VCOM within the display region not going to be displayed during the current display period can either be adjacent or not adjacent to the display region which is going to be displayed.

Figure 4:
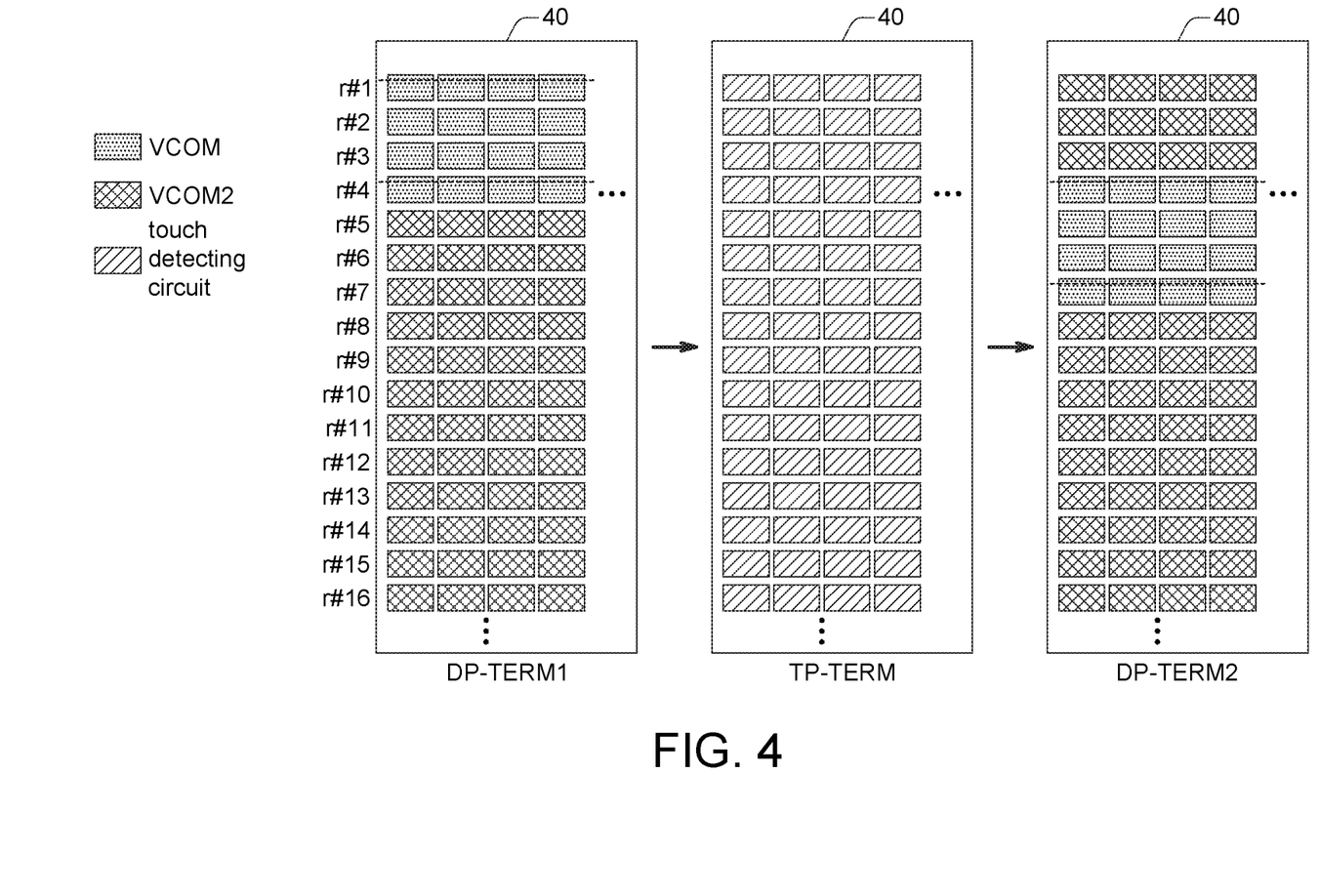
FIGS. 4 and 5 show a schematic diagram of operations that a touch display device according to yet another embodiment of the present invention switches between displaying and touch detecting.
Figure 5:
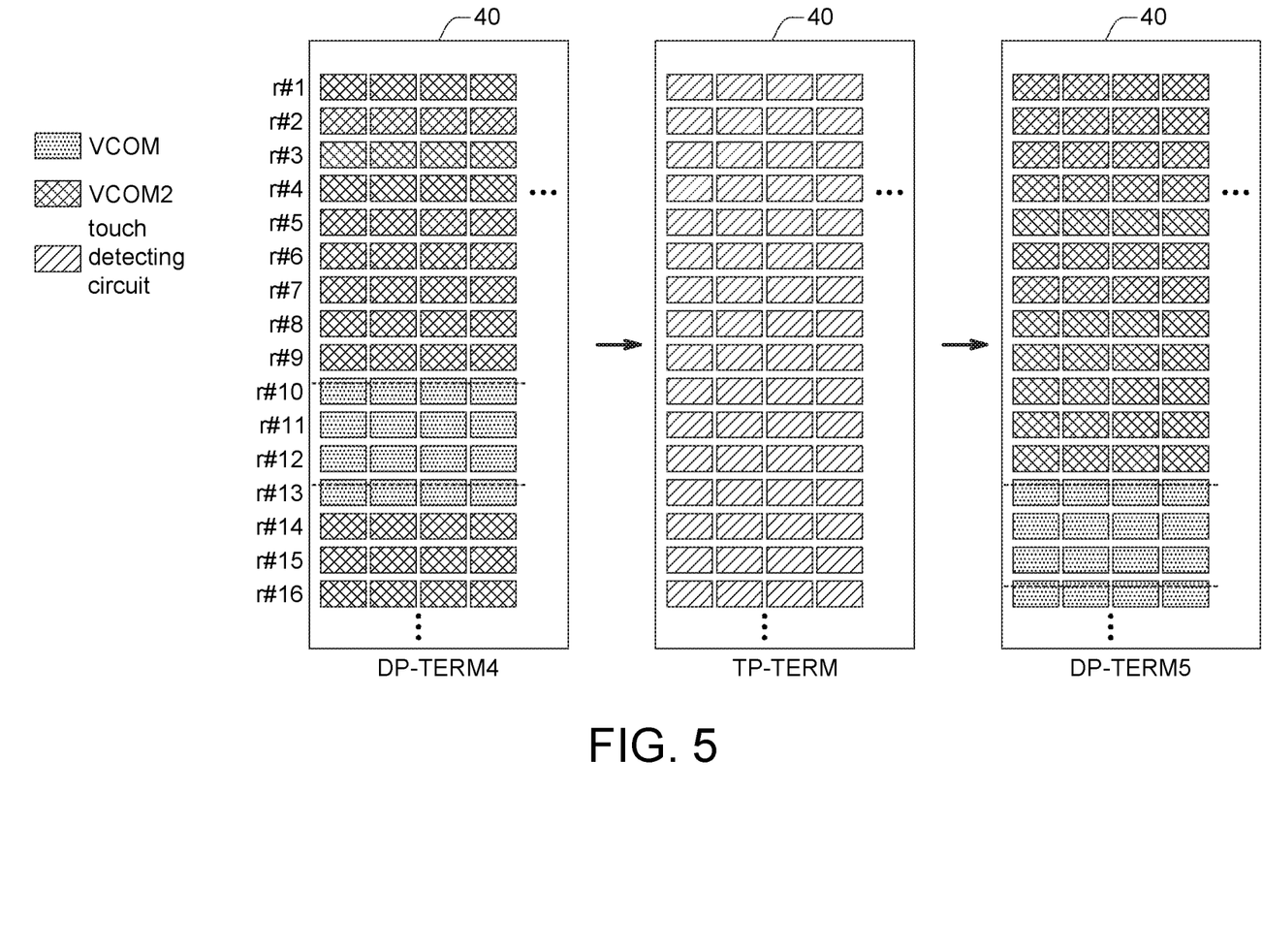

FIGS. 4 and 5 show yet another embodiment. In this embodiment, the touch display panel 40 includes 32 rows of common electrode blocks and 18 columns of common electrode blocks (i.e., 32×18 common electrode blocks). Taking full HD as an example, the resolution of the touch display panel 40 may be 1920×1080. In this example, each row of the common electrode blocks corresponds to 60 display lines (1920/32=60), and each column of the common electrode blocks corresponds to 180 data lines (1080*3/18). In this example, the touch display panel 40 includes 10 display regions, which means that each of the display regions includes 192 display lines. During a display period, 3.2 rows of the common electrode blocks are corresponding to a display region to be displayed. That is, the multiplexing circuit may couple at least four rows of the common electrode blocks to the first common voltage VCOM during a display period.

As shown in FIG. 4, during a first display period (DP-TERM1), the touch display panel 40 displays pixel data of a first display region which includes the first display line to the 192th display line, which corresponds to the first four rows r #1~r #4 of the common electrode blocks. In this embodiment, the multiplexing circuit couples the rows r #1-r #4 of the common electrode blocks corresponding to the display region to be displayed during the current display period to the first common voltage VCOM provided by the TDDI driver (represented by dotted blocks). In this embodiment, the multiplexing circuit couples the other common electrode blocks to the second common voltage VCOM2 (represented by mesh blocks), and in this embodiment the second common voltage VCOM2 is ground voltage. Since the multiplexing circuit couples 4 rows of common electrode blocks rather than all rows of the common electrode blocks to the first common voltage VCOM, the loading seen by the common voltage generation circuit of the TDDI driver which provides the first common voltage VCOM may be decreased to 4/32 (i.e., 1/8) of the original loading, and the recovery speed is increased accordingly. Furthermore, the power consumption for driving the common electrodes during the display period can also be decreased to 1/8.

During a touch detecting period (TP-TERM), all the common electrode blocks are coupled to the touch detecting circuit of the TDDI driver (represented by slashed blocks) for detecting whether a touch event occurs. During a second display period (DP-TERM2), the touch display panel 40 displays the second display region which includes the 193th display line to the 384th display line. That is, the second display region corresponds to the fourth row to the seventh row r #4-r #7 of the common electrode blocks. The multiplexing circuit couples the rows r #4-r #7 of the common electrode blocks corresponding to the display region to be displayed during the current display period to the first common voltage VCOM provided by the TDDI driver (represented by dotted blocks), and couples the other common electrode blocks to the second common voltage VCOM2 (represented by mesh blocks).

As shown in FIG. 5, after a fifth display period (DP-TERM5), a half screen has been displayed by the touch display panel 40. That is, all the display lines corresponding to the first row to the sixteenth row of the common electrode blocks has been displayed. From a sixth display period, the operation may be similar to the first display period.

It is noted that the way to detect touch events in the touch detecting period (TP-TERM) is not limited in the embodiments of the present invention. Although embodiments in FIGS. 3A-3C and FIGS. 4-5 illustrate that all of the common electrode blocks (used as touch detecting electrodes) are coupled to the touch detecting circuit by the multiplexing circuit during the touch detecting period, other way to control the common electrode blocks during the touch detecting period may corporate with the control scheme regarding to the common electrode blocks during the display periods.

Figure 6:
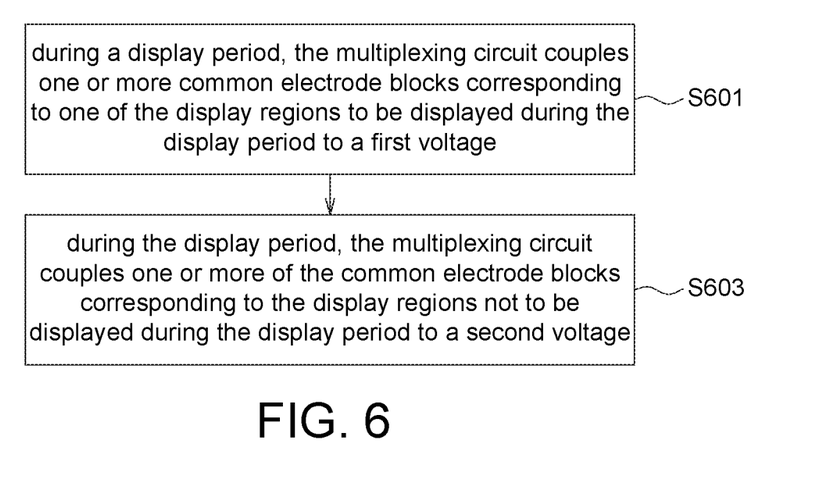
FIG. 6 shows a flowchart of a driving method in touch display device according to an embodiment of the present invention.

FIG. 6 shows a flowchart of a driving method in touch display device according to an embodiment of the present invention. The driving method may be used in the touch display device of the above embodiments. The touch display device includes a touch display panel and a TDDI driver which includes a multiplexing circuit (MUX). The touch display panel includes a number of display regions. The touch display panel includes a number of common electrode blocks.

In step S601, during a display period, the multiplexing circuit couples one or more common electrode blocks corresponding to one of the display regions to be displayed during the display period to a first voltage (e.g., first common voltage VCOM).

In step S603, during the display period, the multiplexing circuit couples one or more of the common electrode blocks corresponding to the display regions not to be displayed during the display period to a second voltage (e.g., second common voltage VCOM2).

Also noted that "a display region to be displayed during a display period" refers to the display region that the pixel data of the display region is refreshed during the display period: and "a display region not to be displayed during a display period" refers to the display region(s) that the pixel data of the display region(s) does/do not be refreshed during the display period.

According to the embodiment described above, by decreasing the amount of the common electrodes coupled to the Common voltage VCOM to the amount that only regards to the display region to be displayed, the loading of the common voltage generation circuit providing the first common voltage VCOM can be reduced, thereby the faster recovery speed can be achieved without affecting the screen display. Since the loading of the circuit providing the first common voltage VCOM is reduced, the power consumption can be reduced accordingly.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch display driving device for driving a touch display panel, the touch display panel comprising a plurality of common electrode blocks and a plurality of display regions, the touch display driving device comprising:
   a multiplexing circuit, configured to:
   during a display period, couple one or more common electrode blocks corresponding to one of the display regions which is to be displayed during the display period to a first voltage; and
   during the display period, couple one or more of the common electrode blocks corresponding to the display regions which are not to be displayed during the display period to a second voltage, wherein the second voltage is a ground voltage; and
   during a starting time in a touch detecting period, couple the common electrode blocks to the ground voltage.

2. The touch display driving device according to claim 1, wherein the multiplexing circuit couples all the common electrode blocks corresponding to the display regions which are not to be displayed during the display period to the second voltage.

3. The touch display driving device according to claim 1, wherein the multiplexing circuit is further configured to, during other time than the starting time in the touch detecting period, couple the common electrodes to a pulse signal, and wherein a DC voltage level of the pulse signal is different from the ground voltage.

4. A driving method, used in a touch display driving device, the touch display driving device comprising a multiplexing circuit and utilized for driving a touch display panel comprising a plurality of common electrode blocks and a plurality of display regions, the driving method comprising:
   during a display period, by the multiplexing circuit, coupling one or more common electrode blocks corresponding to one of the display regions which is to be displayed during the display period to a first voltage; and
   during the display period, by multiplexing circuit a, coupling one or more of the common electrode blocks corresponding to the display regions which are not to be displayed during the display period to a second voltage, wherein the second voltage is a ground voltage, and
   during a starting time in a touch detecting period, by the multiplexing circuit, coupling the common electrode blocks to the ground voltage.

5. The driving method according to claim 4, further comprising during other time than the starting time in the touch detecting period, coupling the common electrodes to a pulse signal, and wherein a DC voltage level of the pulse signal is different from the ground voltage.

6. The driving method according to claim 4, wherein the multiplexing circuit couples all the common electrode blocks corresponding to the display regions which are not to be displayed during the display period to the second voltage.

* * * * *